(12) United States Patent
Ambati et al.

(10) Patent No.: US 7,904,515 B2
(45) Date of Patent: Mar. 8, 2011

(54) SOLUTION FOR MANAGING MULTIPLE RELATED DISCUSSION THREADS IN AN ONLINE COLLABORATION ENVIRONMENT

(75) Inventors: Anilkumar Ambati, Morrisville, NC (US); Akram A. Bou-Ghannam, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 11/869,107

(22) Filed: Oct. 9, 2007

(65) Prior Publication Data

US 2009/0094329 A1 Apr. 9, 2009

(51) Int. Cl.
*G06F 15/16* (2006.01)
(52) U.S. Cl. .......................... 709/205; 715/753
(58) Field of Classification Search .................. 709/204, 709/205, 206
See application file for complete search history.

(56) References Cited

U.S. PATENT DOCUMENTS

| | | | | |
|---|---|---|---|---|
| 6,557,027 B1* | 4/2003 | Cragun | .......................... | 709/204 |
| 6,792,448 B1* | 9/2004 | Smith | .......................... | 709/204 |
| 7,062,532 B1* | 6/2006 | Sweat et al. | .................. | 709/205 |
| 7,072,940 B1* | 7/2006 | Day et al. | ...................... | 709/204 |
| 7,107,544 B1* | 9/2006 | Luke | .............................. | 715/752 |
| 7,143,135 B2* | 11/2006 | Smith et al. | ................... | 709/204 |
| 7,634,546 B1* | 12/2009 | Strickholm et al. | .......... | 709/207 |
| 2001/0018698 A1* | 8/2001 | Uchino et al. | ................ | 707/533 |
| 2003/0014397 A1* | 1/2003 | Chau et al. | ........................ | 707/3 |
| 2003/0163537 A1* | 8/2003 | Rohall et al. | ................... | 709/206 |
| 2004/0230676 A1* | 11/2004 | Spivack et al. | ................. | 709/223 |
| 2005/0027802 A1* | 2/2005 | Madsen et al. | ................. | 709/204 |
| 2005/0044145 A1* | 2/2005 | Quinn et al. | ..................... | 709/205 |
| 2005/0097440 A1* | 5/2005 | Lusk et al. | .................. | 715/500.1 |
| 2005/0149621 A1* | 7/2005 | Kirkland et al. | .............. | 709/207 |
| 2006/0053380 A1* | 3/2006 | Spataro et al. | ................. | 715/753 |
| 2006/0085245 A1* | 4/2006 | Takatsuka et al. | ................. | 705/9 |
| 2006/0271625 A1* | 11/2006 | Kordun | .......................... | 709/204 |
| 2008/0040427 A1* | 2/2008 | Shroff et al. | ................... | 709/204 |
| 2008/0082607 A1* | 4/2008 | Sastry et al. | ................... | 709/204 |
| 2008/0183810 A1* | 7/2008 | Ruedlinger | .................... | 709/203 |

OTHER PUBLICATIONS

Clark, James et al., "XML Path Language (XPath)" [online], Nov. 1999 [retrieved May 2010], W3C, Version 1.0, pp. 1-31.*

* cited by examiner

*Primary Examiner* — Bunjob Jaroenchonwanit
(74) *Attorney, Agent, or Firm* — Patents on Demand, P.A.; Brian K. Buchheit; Scott M. Garrett

(57) ABSTRACT

The present invention discloses a server-side collaboration system that includes a set of discussion threads, a server-side software component, and a server-side data store. The discussion threads can be managed by a collaboration session leader. The collaboration session leader can be a user authorized to define the topic, to create the plurality of discussion threads for the topic, and to assign a set of participants to each created discussion thread. The server-side software component can permit remotely located clients to post and view content by discussion thread during a real-time collaboration, which includes a text exchange capability. Client using participants can be restricted to posting content to discussion threads as authorized by the collaboration session leader. The server-side data store can maintain a viewable history of posted content organized by discussion thread.

17 Claims, 3 Drawing Sheets

SOLUTION FOR MANAGING MULTIPLE RELATED DISCUSSION THREADS IN AN ONLINE COLLABORATION ENVIRONMENT

BACKGROUND

1. Field of the Invention

The present invention relates to the field of online collaboration and, more particularly, to managing multiple related discussion threads in an online collaboration environment.

2. Description of the Related Art

Today's businesses often include personnel located in a variety of geographic areas. To manage these widespread resources, businesses employ many different types of communication tools. A popular type of communication tool is online collaboration. Online collaboration is a broad group of tools and/or environments that facilitate the ability for scattered personnel to work together on business projects. Video conferencing, Web meetings, and instant messaging systems are some example of online collaboration tools.

A problem encountered with many online collaboration tools is the inability to adequately segregate and manage the variety of discussion threads that can occur during the course of a collaboration session. For example, an online meeting discussing a planned software upgrade can include comments from participants that range from implementation and system concerns to budget and staffing issues. In this type of situation, the information pertaining to each different type of concern or issue becomes intermixed, which makes it difficult to ascertain key points and action items when the meeting concludes.

Meeting chairs often attempt to combat this type of conglomeration by creating a meeting agenda. Although an agenda is useful for organizing discussion threads, it does not have any impact on segregating discussion messages within the tool used for collaborating. For example, in an online meeting, the meeting agenda does not limit how the meeting participants post messages in a chat window; the software application used for conducting the online collaboration cannot force participants to post messages according to the agenda. Additionally, meeting agendas, while typically adequate for guiding interpersonal meetings, do not organize information in a fashion that facilitates structured archiving and/or structured searching of information. In an online collaboration, information archiving can be extremely important, especially since participants may desire to add and share information before and after a meeting with sets of meeting participants.

What is needed is a solution that manages multiple related discussion threads in online collaboration. That is, the solution would allow a collaboration session leader to define a topic model for the online collaboration that includes various related discussion threads. Ideally, such a solution could segregate the messages of the online collaboration by the discussion threads of the topic model within a user interface.

SUMMARY OF THE INVENTION

The present invention discloses a solution for establishing long-running threads for topically organizing electronic collaborations. The threads can be discussion threads established by a collaboration session leader or coordinator. The solution can use a topic model, which categorizes information in a domain and portrays the actual structure or hierarchy of domain information, to organize the discussion threads. That is, each discussion thread can be associated with a node of the topic model. Various participants can be invited to join specific discussion threads. Other threads can optionally be viewable to the participants, who can submit requests to the collaboration session leader to join non-assigned threads. The collaboration can include one or more scheduled real-time collaborations (e.g., meetings) among a set of participants. Permissions can be selectively assigned by the collaboration session leader to post and view pre-meeting content for the various discussion threads as well as to post and view post-meeting content. At a time of the meeting, all posted content can be viewable by authorized participants. Participants can use interfaces to interact during the collaboration that includes different window areas for different discussion threads and/or that includes discussion thread designators to permit participants to associate comments with a related thread. Meeting content can be stored by discussion thread, which helps organize and manage collaboration content for archiving and searching purposes.

The present invention can be implemented in accordance with numerous aspects consistent with material presented herein. For example, one aspect of the present invention can include a server-side collaboration system that includes a set of discussion threads, a server-side software component, and a server-side data store. The discussion threads can be software defined items configured to be established for a topic and configured to be managed by a collaboration session leader. The collaboration session leader can be a user authorized to define the topic, to create the plurality of discussion threads for the topic, and to assign a set of participants to each created discussion thread. The server-side software component can permit remotely located clients to post and view content by discussion thread during a real-time collaboration, which includes a text exchange capability. Client using participants can be restricted to posting content to discussion threads as authorized by the collaboration session leader. The server-side data store can maintain a viewable history of posted content organized by discussion thread. The software defined items and the server-side software components can be specified by a set of programmatic instructions stored within a machine readable media configured to be read and acted upon by a server-side computing device, which is used for online collaborations.

Another aspect of the present invention can include a system for managing multiple related discussion threads in an online collaboration environment. The system can include a topic model, multiple collaboration interfaces, and a data store. The topic model can define a set of discussion threads for an online collaboration event. The discussion threads can represent distinct logical groupings of information related to a central subject of the topic model. The collaboration interfaces can each present at least one discussion thread of the topic model in an online collaboration environment. When a participant is authorized for multiple discussion threads, an associated collaboration interface can simultaneously present content exchanged within those threads to the participant. The collaboration interfaces can segregate exchanged communications by discussion thread. The data store can store the topic model, data associated with the discussion threads, and registration data associated with the participants for the online collaboration event. The registration data can include a subset of the discussion threads, wherein the subset defines which of the discussion threads a participant has access to as well as defining an information access designation for each participant.

Still another aspect of the present invention can include a method for managing multiple related discussion threads for a topic in an online collaboration environment. The method can include a step of defining a topic model for an online collaboration event. The topic model can be a hierarchical representation of a set of discussion threads. The discussion threads can represent distinct logical groupings of data related to a central subject of the topic model. One or more participants can register for the online collaboration event. Each participant can be assigned a subset of the discussion threads. The collaboration event can include a real-time collaboration session in which content including text organized by specific discussion threads is exchanged among the registered participants. During the real-time collaboration session, registered participants can be presented with exchanged content associated with their subset of discussion threads within an online collaboration interface. The online collaboration interface can segregate or organize exchanged content based upon an associated discussion thread. Upon conclusion of the real-time collaboration session, session content can be archived in a manner organized based upon the discussion threads defined in the topic model.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
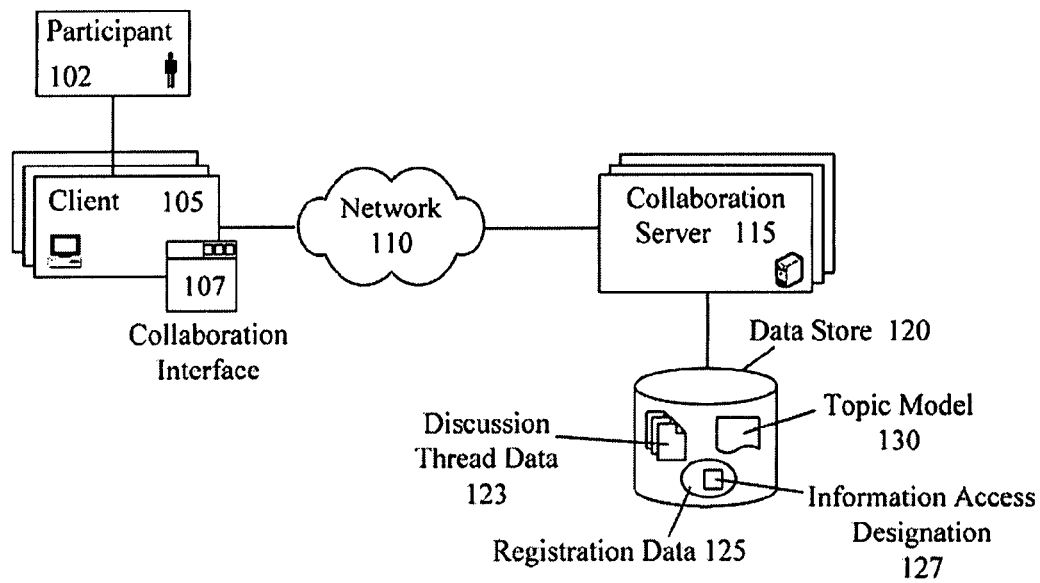
FIG. 1 is a schematic diagram of a system for managing multiple related discussion threads in an online collaboration environment in accordance with embodiments of the inventive arrangements disclosed herein.

FIG. 1 is a schematic diagram of a system 100 for managing multiple related discussion threads in an online collaboration environment in accordance with embodiments of the inventive arrangements disclosed herein. In an online collaboration session (e.g., chat session, instant messaging session, video teleconferencing session, co-browsing session, etc.), a participant 102 can utilize the collaboration interface 107 of client 105 to perform collaboration activities regarding a specified topic model 130 on a collaboration server 115 accessible over a network 110.

As used herein, a collaboration server 115 is defined as including the server-side software (not shown) that is necessary to conduct online collaboration in addition to the physical computing device. It is important to note that an online collaboration session can include multiple modes of communication to support various collaboration activities, and, as such, the system 100 can require multiple collaboration servers 115 running corresponding software applications.

The topic model 130 can be a hierarchical and structured representation of multiple discussion threads that are related to a central subject. For example, a central subject can relate to sporting activities to be established for a large organization, such as a university having an intramural sports program. A topic model 130 for sports can be divided into a structured hierarchy, where "Sports" could be a top-level node of the hierarchy, child nodes of the top-node can include "Ball Sports," "Water Sports," "Motor Sports," and the like. Child nodes of "Ball Sports" can include "Soccer," "Football," "Volleyball," and the like. Online messages generic to all sports can be posted to the sports discussion thread, messages specific to ball sports can be posted to that discussion thread, and so forth. Content can be archived and/or searched on a discussion thread specific level.

The topic model 130 is used by the software of the collaboration server 115 during online collaboration. That is, the discussion threads defined within the topic model 130 are the only threads available to participants 102 during the collaboration session. That is, the topic model 130 is a concept used to categorize information in a domain, which portrays an actual structure or hierarchy of domain information. The topic model 130 can be written in a standardized language, such as an extensible markup language (XML), to ensure interoperability among system 100 components. In one contemplated embodiment, the topic model 130 can be represented using XML PATH Language (XPATH) compliant expressions.

Participants 102 in the online collaboration can be registered for any or all of the discussion threads defined in the topic model 130. The subset of discussion threads a participant 102 is registered for can be stored in a data store 120 as registration data 125. Continuing with the above example, a Football Intramural Coordinator may only be registered for posting information to the Football Thread, while a Ball Sports Coordinator may be registered for posting information to the Ball Sports Thread and all sub-threads, such as Soccer, Football, Volleyball, and the like. Access and permissions granted for a parent thread do not necessarily tier down to related child nodes of the topic model 130 hierarchy. That is, the Ball Sports Coordinator may have permission to post content to the Ball Sports Thread yet lack permission to post content to the Volleyball Thread.

A real-world situation for system 100 can pertain to a situation where a software problem is posted by a user to a problem reporting discussion thread. The problem can be related to a defect, referred to as Defect A. A new discussion thread can be established within the topic model 130 for Defect A. A problem resolution team must now go through a problem determination process to determine and resolve a cause of a Defect A. Defect A can be related to many aspects including configuration and installation, design, bad input data, bad operating procedures, etc. The team can discuss each of these aspects from a functional design viewpoint, from an installation and configuration viewpoint, from an operational viewpoint, etc. Each of these viewpoints are various aspects of the problem determination space (domain) and can be associated with a distinct discussion thread. The topic model 130 for defects can then be structured to include a parent node of Defects, which has one child node for Defect A. Defect A can be a parent node for a Functional Thread, an Installation and Configuration Thread, an Operational Thread, etc. Specific real-time meetings can occur for different ones of the discussion threads, where different meetings have different set of participants. Content posted before, during, and after a meeting can be saved within a structure defined by a suitable discussion thread. Permissions for posting and viewing content by defined on a thread-by-thread basis within the topic model 130.

It should be noted that this association of participants 102 with discussion threads allows the collaboration server 115 to handle each topic separately during the collaboration session. That is, while all of the discussion threads are available during the collaboration session, participants 102 are limited to what threads they can interact with based upon which threads they are registered for. In one embodiment, a collaboration session leader or coordinator can define which discussion threads are to be associated with which participants 102. If a participant 102 wishes to be involved in a non-assigned discussion thread, the collaboration session leader may have to approve the participant 102 for that thread.

It should also be noted that registration for the discussion threads of the topic model 130 can be implemented as a separate process from the process of inviting participants 102 to the online collaboration event. In another contemplated embodiment, discussion thread registration can be integrated into the invitation process, such as in the form of a pop-up window inviting a participant 102 to register for one or more discussion threads.

The registration data 125 can also include an information access designation 127 for each participant 102. The information access designation 127 can be an identifier that indicates to the collaboration server 115 how a specific participant 102 can interact with a discussion thread prior to the start of a scheduled real-time collaboration session. The information access designation 127 can allow a participant 102 to add discussion thread data 123 and/or view posted discussion thread data 123. Example information access designations 127 can include information consumer, information producer, viewer, publisher, or such similar labels. This can permit pre-meeting information to be conveyed among participants 102, which is available to all appropriate participants 102 at a time of the meeting.

Expanding the previous real-world example, a coordinator for the Operational Thread for Defect A can be assigned an information access designation 127 of Information Consumer of the Defect A Thread while a Defect A Coordinator can be assigned permissions of an Information Consumer and an Information Producer to the Defect A Thread. Thus, prior to scheduled collaboration session involving the Operational Thread, the collaboration server 115 can allow the Defect A Coordinator to view and add data 123 to the Operational Thread, while the Operational Coordinator is limited to only viewing data of the Operational Thread. It is important to stress that these designations 127 apply only to actions that are performed prior to the collaboration session; during the collaboration session, both the Defect A Coordinator and the Operational Coordinator can freely exchange data in the Operational Thread. It should also be understood that post meeting information can similarly be established using different information access designators 127. Thus, the Operational Coordinator can be assigned Information Provider/Consumer status on a post-meeting Operational Thread, which allows the coordinator to view and post new content to the Operational Thread after a scheduled real-time collaboration is held.

It is important to emphasize that online collaboration activities with the discussion threads of the topic model 130 can occur asynchronously and prior to the scheduled start of the actual collaboration session as well as subsequent to an end time of the collaboration session. For example, Defect A Coordinator can schedule an online chat session to discuss a current status of Defect A for next week and can permit coordinators of child nodes of the Defect A node to participate in the chat session. The chat session participants can be granted view and/or view-update permission on pre-meeting content posted by Defect A Coordinator to the Defect A Thread. In one embodiment, different meetings can even represent child nodes of a parent. So the chat session can be represented by a Meeting A Thread. Thus, any number of meetings and thread-level permissions can be easily handled using topic model 130.

The topic model 130, registration data 125, and discussion thread data 123 can all be stored in a data store 120 accessible by the collaboration server 115. The discussion thread data 123 can represent all data items provided by participants 102 for the topic model 130. The discussion thread data 123 can include a variety of data types supported by the collaboration server 115, such as a long-running chat log, file uploads, email, postings to a bulletin board system (BBS), a conglomeration of data types, and the like. In an alternate embodiment, these elements 123, 125, and 130 can be stored in separate data stores.

Participants 102 can use a collaboration interface 107 to perform collaboration activities. The collaboration interface 107 can represent the user interface of a software application used for online collaboration activities. It should be noted that the collaboration activities supported by the collaboration interface 107 depends upon the collaboration server 115. For example, a video conference cannot be performed in a collaboration interface 107 with a collaboration server 115 that does not support video conferencing.

The collaboration interface 107 can include a variety of communication types, including, but not limited to, instant messaging, an Internet bulletin board system (BBS), email, file sharing, video streaming, audio streaming, a combination of types, and the like. Further, the collaboration interface 107 can identifiably distinguish the presentations of multiple discussion threads. Distinctions can be made by spatially separating individual discussion threads, as in separate windows or panes, or by visually identifying each thread, as in color-coding.

The client 105 can be a computing device capable of running the collaboration interface 107 and supporting the collaboration activities of the collaboration server 115. Client 105 can be any of a variety of computing devices including, but not limited to, a personal computer, a personal data assistant (PDA), a mobile phone, a video teleconference device, and the like.

Network 110 can include any hardware/software/and firmware necessary to convey data encoded within carrier waves. Data can be contained within analog or digital signals and conveyed though data or voice channels. Network 110 can include local components and data pathways necessary for communications to be exchanged among computing device components and between integrated device components and peripheral devices. Network 110 can also include network equipment, such as routers, data lines, hubs, and intermediary servers which together form a data network, such as the Internet. Network 110 can also include circuit-based communication components and mobile communication components, such as telephony switches, modems, cellular communication towers, and the like. Network 110 can include line based and/or wireless communication pathways.

As used herein, presented data stores, including store 120 can be a physical or virtual storage space configured to store digital information. Data store 120 can be physically implemented within any type of hardware including, but not limited to, a magnetic disk, an optical disk, a semiconductor memory, a digitally encoded plastic memory, a holographic memory, or any other recording medium. Data store 120 can be a stand-alone storage unit as well as a storage unit formed from a plurality of physical devices. Additionally, information can be stored within data store 120 in a variety of manners. For example, information can be stored within a database structure or can be stored within one or more files of a file storage system, where each file may or may not be indexed for information searching purposes. Further, data store 120 can utilize one or more encryption mechanisms to protect stored information from unauthorized access.

Figure 2:
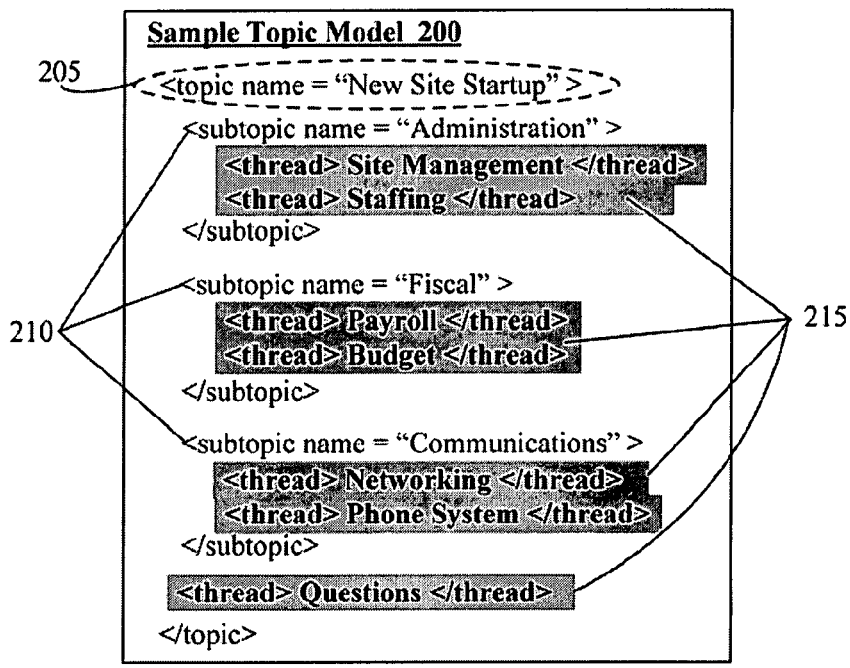
FIG. 2 is a sample topic model in accordance with an embodiment of the inventive arrangements disclosed herein.

FIG. 2 is a sample topic model 200 in accordance with an embodiment of the inventive arrangements disclosed herein. The sample topic model 200 can be a used by system 100 or any other system capable of utilizing a topic model to manage multiple related discussion threads in an online collaboration environment. It should be noted that the sample topic model 200 is for illustrative purposes only and is not meant as a definitive representation of implementation.

The sample topic model 200 can be written in a standardized language and format, such as the extensible markup language (XML) used in this example. The topic model 200 can include a central subject 205 and discussion threads 215. In this illustrative representation, subtopic 210 tags have been used to provide additional structure for categorizing discussion threads 215. It is important to note that the overall structure of the topic model 200 is crucial for establishing the relationships between the elements of topic model 200.

In this example, the central subject 205 is represented by a topic tag. Additional information can be included in the XML tag, such as the name attribute "New Site Startup". Such information can be used by the collaboration server and/or collaboration interface for collaboration activities.

Directly descended from the central subject 205 are three subtopics 210—Administration, Fiscal, and Communications—and a discussion thread 215, Questions. Each subtopic 210 contains two discussion threads 215.

It should be noted that the discussion threads 215 are the level at which data is collected; the topic 205 and subtopics 210 merely represent organizational placeholders.

Figure 3:
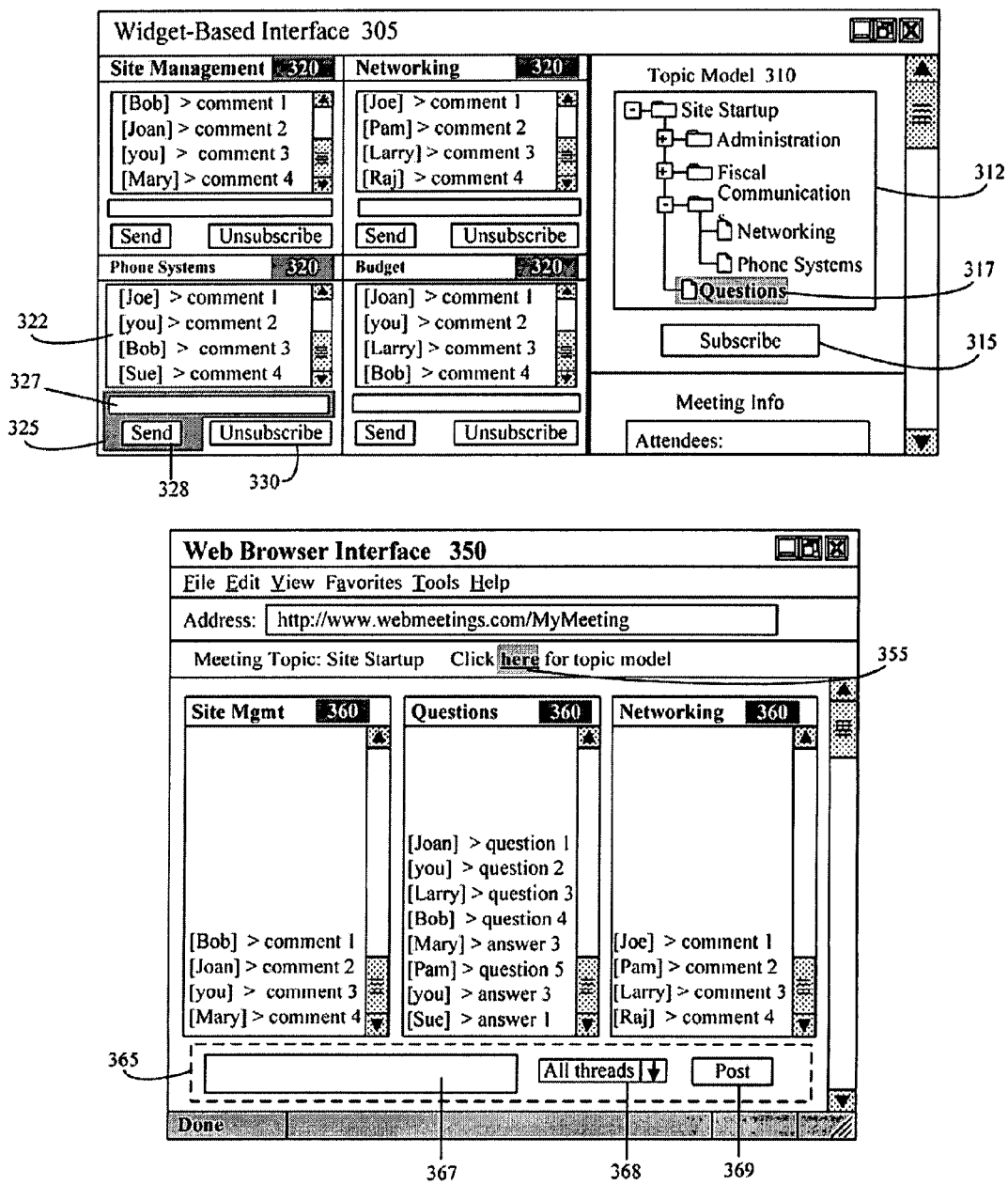
FIG. 3 is a collection of collaboration interfaces for managing multiple related discussion threads for online collaboration in accordance with an embodiment of the inventive arrangements disclosed herein.

FIG. 3 is a collection 300 of collaboration interfaces 305 and 350 for managing multiple related discussion threads for online collaboration in accordance with an embodiment of the inventive arrangements disclosed herein. The collaboration interfaces 305 and 350 of collection 300 can represent the collaboration interface 107 of system 100.

Collection 300 can include a widget-based interface 305 and a Web browser interface 350 for the display and handling of online collaboration activities for multiple discussion threads. The widget-based interface 305 can utilize the capabilities of a standard programming language for building GUIs that is compatible with the overall online collaboration system. A widget can be any fundamental component of a GUI, such as a button, a slider bar, a menu, a scroll-barred window, and the like.

The widget-based interface 305 can include a topic model area 310 and multiple discussion thread areas 320, each area 320 specific to a discussion thread. In another contemplated embodiment, the discussion thread areas 320 can exist as independent windows external to the main interface 305 containing the topic model area 310.

The topic model area 310 can include a topic model display 312 and a subscription button 315. The topic model display 312 can present a user with a visual representation of the topic model, such as the sample topic model 200 of FIG. 2. The topic model display 312 can allow for user interaction, such as the tree structure shown in this example. In this example, a user can collapse/expand branches of the tree as well as click on discussion threads, indicated by highlighting the discussion thread name 317.

In another embodiment, the topic model display 312 can be a user-activated display, such as a pop-up window, fly-over window, or a roll-over window, that remains hidden until selected.

A user can utilize the subscribe button 315 to subscribe to a highlighted discussion thread 317 in the topic model display 312. Use of the subscribe button 315 can result in a corresponding discussion thread area 320 being added to the interface 305.

A discussion thread area 320 can represent the space where collaboration activities take place for a specific discussion thread that a user is registered for. As shown in this example, the user is registered participating in the collaboration of four discussion threads—Site Management, Networking, Phone Systems, and Budget. As previously stated, it should be noted that the discussion thread area 320 and collaboration activities that occur within the discussion thread area 320 must be supported by the collaboration system.

The discussion thread area 320 can include a thread display 322, a data communication mechanism 325, and an unsubscribe button 330. The unsubscribe button 330 can be the mechanism by which a user resigns themselves from the collaboration activities of a discussion thread.

The thread display 322 can present the user with a history of data communications that have occurred prior to and during the online collaboration session. As shown in this example, the thread display 322 of the Phone Systems thread area 320 lists a long-running thread.

The thread display 322 can be configured to support the types of data communications supported by the collaboration system. For example, the thread display 322 can include file uploads as clickable icons as well as the text of a long-running thread. Interface 305 can support (not shown) video, music, and other media files. Interface 305 can also support (not shown) remote desktop interactions and co-browsing activities.

The data communications mechanism 325 can be the means by which a user of the interface 305 can contribute data to the online collaboration. The data communications mechanism 325 can include a variety of communication types, including, but not limited to, instant messaging, video conferencing, Voice over Internet Protocol (VoIP) communications, file sharing, and the like. In this example, the discussion thread area 320 is a chat window and the data communications mechanism 325 is the text field 327 and send button 328.

In another contemplated embodiment, the interface 305 can contain a single discussion thread area 320 in which all collaboration activities for all registered discussion threads can be conducted. While the collaboration server can still treat the data for each discussion thread separately, the data can be displayed as received in the thread display 322. In order to combat confusion, the data for each discussion thread can be color-coded.

The Web browser interface 350 can represent a Web-based collaboration interface and can provide functionality similar to that of the widget-based interface 305. This example of a Web browser interface 350 does not display the topic model, but provides a user with a hyperlink 355 to the topic model.

The Web browser interface 350 can also include multiple discussion thread displays 360 and a data communications mechanism 365. The data communications mechanism 365 can include a text field 367, a thread selector 368, and a post button 369. A user can add a text message to the text field 367, select which thread or threads to send the message to with the thread selector 368, and send the message to the selected thread(s) with the post button 369.

It is important to note that in this example, the discussion thread display 360 and data communications mechanism 365 do not have a one-to-one relationship; the single data communication mechanism 365 can submit data for any or all of the discussion thread displays 360 via the thread selector 368.

Figure 4:
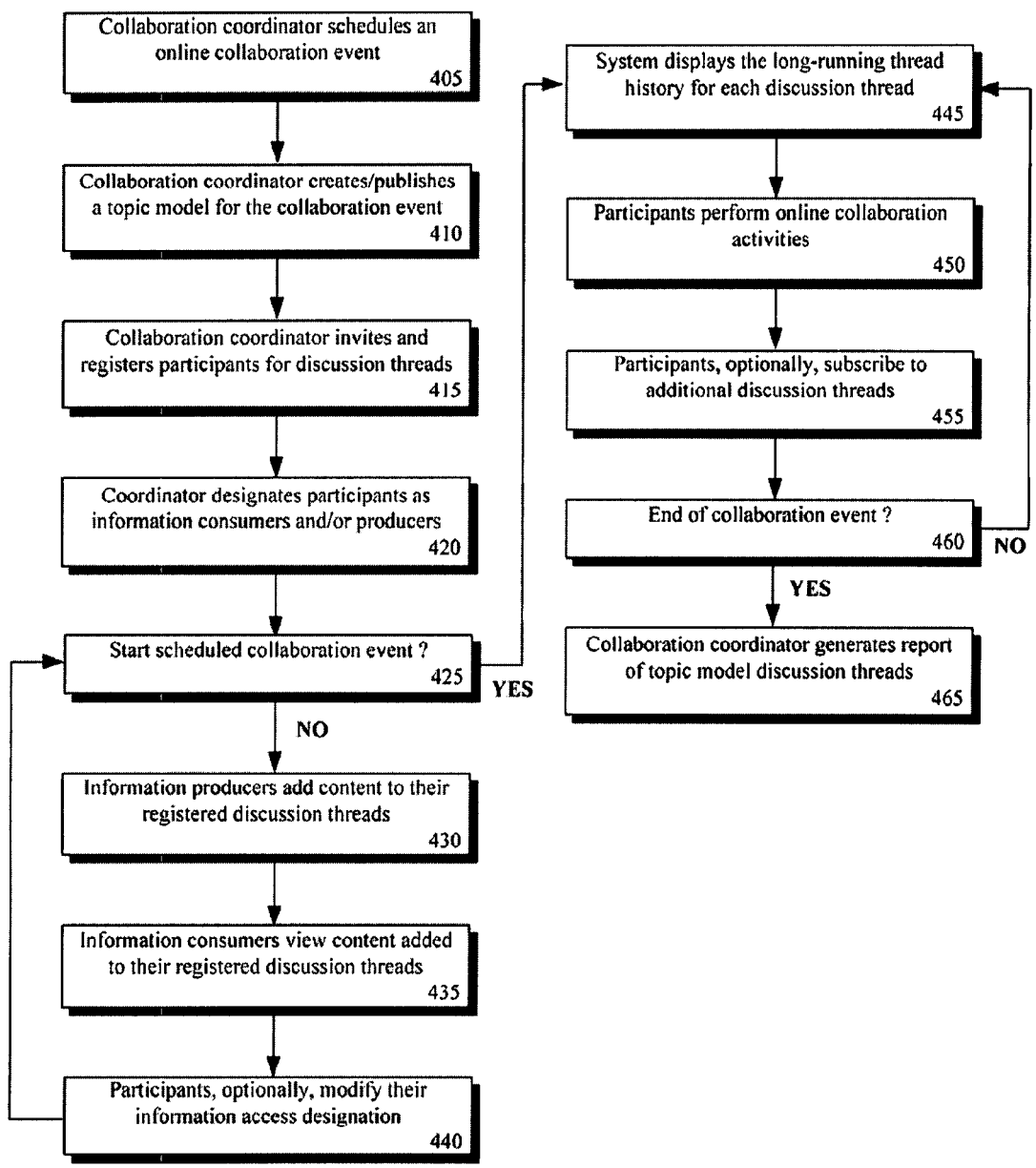
FIG. 4 is a flow chart of a method for utilizing an online collaboration system that manages multiple related discussion threads in accordance with an embodiment of the inventive arrangements disclosed herein.

FIG. 4 is a flow chart of a method 400 for utilizing an online collaboration system that manages multiple related discussion threads in accordance with an embodiment of the inventive arrangements disclosed herein. Method 400 can be performed within the context of system 100 and/or using the sample topic model 200 of FIG. 2 and/or the collaboration interfaces 305 and 350 of collection 300, or any other system configured to use a topic model to manage multiple related discussion threads.

Method 400 can begin with step 405 where a collaboration session leader or coordinator schedules an online collaboration event. The collaboration coordinator can represent a user with the capability to schedule collaboration events for the online collaboration system, such as a designated event chairman, assistant, or other collaboration session leader. In one configuration, different discussion threads can be assigned thread-level coordinators.

In step 410, the collaboration coordinator can create and publish a topic model for the collaboration event. The collaboration coordinator can invite and register participants for the discussion threads in step 415. In step 420, the collaboration coordinator can designate the participants as information consumers and/or information producers for the discussion threads.

In step 425, it can be determined if it time to start the collaboration event. When it is not time to start the collaboration event, step 430 can execute in which information producers can add content to their registered threads. Information consumers, in step 435, can then view the content added to their registered discussion threads. Participants can optionally modify their information access designation in step 440. Upon completion of step 440, the flow of method 400 can return to step 425 and can continue to loop through steps 430-440 until the commencement of the collaboration event.

When it is time to start the collaboration event, step 445 can execute where the collaboration system displays the long-running thread history for each discussion thread. In step 450, participants of the collaboration event can perform collaboration activities. Optionally, participants can subscribe to additional discussion threads in step 455.

In step 460, it can be determined if the end of the collaboration event has been reached. When the collaboration event ends, step 465 can execute in which the collaboration coordinator can generate a report of the topic model discussion threads. Due to the nature in which the collaboration system handles the multiple discussion threads, the data for such a report can be easily organized according to discussion thread.

When the end of the collaboration event has not been reached, the flow of method 400 can return to step 445 and can continue to loop through steps 445-460 until the commencement of the collaboration event.

It should also be noted that the collaboration coordinator need not be the same person for each step. For example, the department head's assistant can perform steps 405 and 465 while the department head performs steps 410, 415, and 420.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A server-side collaboration system comprising:
a plurality of discussion threads that are software defined items configured to be established for a topic and configured to be managed by a collaboration session leader, wherein said collaboration session leader is a user authorized to define the topic, to create the plurality of discussion threads for the topic, and to assign a set of participants to each created discussion thread, wherein the topic is related to a topic model, wherein said topic model is a hierarchical organization of the plurality of discussion threads, wherein each of the discussion threads represent a distinct logical grouping of data related to a central subject of the topic, and wherein at least a portion of the discussion threads are for a time bound event, wherein said collaborative session leader is able to assign different permissions for access to the portion of discussion threads granted to the participants for a time before the time bound event, for a time during the time bound event, and for a time after the time bound event;
a server-side software component configured to permit remotely located clients to post and view content by discussion thread during a real-time collaboration, which includes a text exchange capability, wherein client using participants are only permitted to post content to discussion threads as authorized by the collaboration session leader; and
a server side data store configured to maintain a viewable history of posted content organized by discussion thread, wherein said software defined items and said server-side software components are specified by a set of programmatic instructions stored within a machine readable media configured to be read and acted upon by a server-side computing device, which is used for online collaborations.

2. The system of claim 1, wherein said collaboration session leader is able to establish a time for said real-time collaboration and is able to establish permissions assigned to participants for posting and viewing content before said time, wherein said established permissions are granted on a per-discussion thread basis, wherein posted content is available to all participants relating to an associated thread at the established time and for at least the duration of the real-time collaboration.

3. The system of claim 1, wherein said collaboration session leader is able to establish a time for said real-time collaboration and is able to establish permissions assigned to participants for posting and viewing content after said time, wherein said established permissions are granted on a per-discussion thread basis.

4. The system of claim 1, wherein clients of the server-side collaboration system comprise a topic interface, which is able to simultaneously present content at least one of real-time and near-real time that has been posted to a plurality of different discussion threads associated with a common topic during the real-time collaboration, wherein said topic interface is further able to post content to discussion threads to which a participant using the topic interface has been authorized by the collaboration session leader.

5. The system of claim 1, wherein the topic model is defined by code written in an Extensible Markup Language (XML) based language.

6. The system of claim 1, wherein the topic model is defined by code written in an Extensible Markup Language (XML) PATH (XPATH) based language.

7. A system for managing multiple related discussion threads in an online collaboration environment comprising:
a topic model that defines a plurality of discussion threads for an online collaboration event, wherein each of the discussion threads are configured to be established for a topic and to be managed by a collaboration session leader, wherein the topic is related to a topic model, wherein said topic model is a hierarchical organization of the plurality of discussion threads, wherein each of the discussion threads represent a distinct logical grouping of data related to a central subject of the topic, and wherein at least a portion of the discussion threads are for a time bound event, wherein said collaborative session leader is able to assign different permissions for access to the portion of discussion threads granted to a plurality of participants for a time before the time bound event, for a time during the time bound event, and for a time after the time bound event;
a plurality of collaboration interfaces for clients, each configured to present at least one of discussion threads of the topic model in an online collaboration environment, wherein the collaboration interface segregates exchanged communications related to the collaboration event by discussion thread; and
a server-side data store configured to store the topic model, data associated with the plurality of discussion threads, and registration data associated with the plurality of participants for the online collaboration event, wherein the registration data includes a subset of the plurality of discussion threads, wherein the subset defines which of the plurality of discussion threads a participant has access to, and an information access designation for each participant.

8. The system of claim 7, wherein the information access designation is at least one of an information consumer, an information producer, and both an information consumer and producer, wherein said information access designation defines actions allowed by the participant prior to a real-time collaboration session defined as part of the online collaboration event.

9. The system of claim 8, wherein an information access designation of information producer allows the participant to add data to a discussion thread within the subset of the information producer, and wherein an information access designation of information consumer limits the participant to viewing the data added by information producers to a discussion thread that is within the subset of the information consumer.

10. The system of claim 7, wherein the discussion thread data includes a viewable historical log for each discussion thread of the plurality of discussion threads, wherein the historical log comprises a plurality of content items from the plurality of different participants.

11. The system of claim 7, wherein the online collaboration event utilizes a plurality of standardized communication protocols, wherein the plurality of standardized communication protocols is capable of a plurality of data transmission modes to include one or more of an instant messaging session, an Internet bulletin board system (BBS), a WIKI, a Voice over Internet Protocol (VoIP) session, a file sharing session, a video streaming session, and an audio streaming session.

12. The system of claim 7, wherein the plurality of collaboration interfaces identifiably segregates each discussion thread by presenting each discussion thread within one of a plurality of different partitioned areas of a single window wherein each of the different partitioned areas is for a corresponding topic.

13. A method for managing multiple related discussion threads for a topic in an online collaboration environment comprising:
defining a topic model for an online collaboration event, wherein the topic model is a hierarchical organization of a plurality of discussion threads, and wherein the plurality of discussion threads represent heretically organized information nodes of the topic model, wherein each of the discussion threads represent a distinct logical grouping of data related to a central subject of a topic, and wherein at least a portion of the discussion threads are for a time bound event;
registering one or more participants for the online collaboration event, wherein each participant is assigned a subset of the plurality of discussion threads, and wherein the collaboration event comprises a real-time collaboration session in which content including text organized by specific discussion threads is exchanged among the registered participants;
assigning different permissions for access to a portion of discussion threads granted to one or more participants for a time before the time bound event, for a time during the time bound event, and for a time after the time bound event;
during the real-time collaboration session presenting the one or more registered participants with their subset of discussion threads and the topic model within an online collaboration interface, wherein the online collaboration interface identifiably segregates each discussion thread within the subset; and
upon conclusion of the real-time collaboration session, archiving session content in a manner organized by the plurality of discussion threads defined in the topic model, wherein the defining, registering, assigning, presenting, and archiving are performed by at least one machine in accordance with at least one computer program stored in a computer readable media, said computer programming having a plurality of code sections that are executable by the at least one machine.

14. The method of claim 13, wherein the topic model is configured to be managed by a collaboration session leader, wherein said collaboration session leader is a user authorized to define the topic for the topic model, to create the plurality of discussion threads for the topic, and to assign a set of participants to each created discussion thread, wherein participants are restricted to posting information to only those discussion threads that the collaboration session leader has granted authorization.

15. The method of claim 13, wherein the registering step further comprises:
    assigning an information access designation to a participant is at least one of an information consumer, an information producer, and both an information consumer and producer, wherein said information access designation defines actions allowed by the participant prior to the start of the real-time collaboration session, wherein posted content related to the online collaboration event provided before the start of the real-time collaboration session is available to participants on a discussion thread-by-thread basis.

16. The method of claim 13, wherein the online collaboration interfaces identifiably segregate each discussion thread within the subset using at least one of color-coding each discussion thread by topic.

17. The method of claim 13, wherein the topic model is a hierarchically organized by topic and subtopics, wherein at least a portion of the discussion threads are organized under at least one subtopic, wherein topic and subtopics of the topic model are organizational placeholders for organizing threads, wherein the topic model is written in extensible markup language (XML).

* * * * *